(12) United States Patent
Binder

(10) Patent No.: US 10,900,572 B2
(45) Date of Patent: Jan. 26, 2021

(54) VALVE DEVICE

(71) Applicant: BINDER GMBH, Ulm (DE)

(72) Inventor: Robert Binder, Laichingen (DE)

(73) Assignee: BINDER GMBH, Ulm (DE)

( * ) Notice: Subject to any disclaimer, the term of this patent is extended or adjusted under 35 U.S.C. 154(b) by 0 days.

(21) Appl. No.: 16/006,045

(22) Filed: Jun. 12, 2018

(65) Prior Publication Data

US 2018/0347708 A1    Dec. 6, 2018

Related U.S. Application Data

(63) Continuation of application No. PCT/EP2016/081243, filed on Dec. 15, 2015.

(30) Foreign Application Priority Data

Dec. 16, 2015    (DE) .................. 10 2015 121 983

(51) Int. Cl.
*F16K 3/02*    (2006.01)
*F16K 3/312*    (2006.01)
(Continued)

(52) U.S. Cl.
CPC .......... *F16K 3/0218* (2013.01); *F16K 3/0227* (2013.01); *F16K 3/0236* (2013.01);
(Continued)

(58) Field of Classification Search
CPC ........ F16K 3/02; F16K 3/0209; F16K 3/0245; F16K 3/0281; F16K 3/0218; F16K 3/22;
(Continued)

(56) References Cited

U.S. PATENT DOCUMENTS 2,000,853 A   5/1935   Lange
2,001,271 A   5/1935   Smith
(Continued)

FOREIGN PATENT DOCUMENTS

CH    652180 A5    10/1985
CN    2434484 Y     6/2001
(Continued)

OTHER PUBLICATIONS

English translastion of International Preliminary Report on Patentability (Chapter I) for PCT/EP2016/081243; dated Jun. 19, 2018; 11 pp.

(Continued)

*Primary Examiner* — Hailey K. Do
(74) *Attorney, Agent, or Firm* — Harness, Dickey & Pierce, P.L.C.

(57) ABSTRACT

The invention relates to a valve apparatus for a gaseous medium, having a valve body with an opening which can be flowed through in the flow direction by the medium and is delimited by way of a circumferential face in the valve body. An orifice is arranged in a gap within the valve body such that it can be displaced perpendicularly with respect to the flow direction, in order to influence the flow through the opening. The gap divides the circumferential face into an inlet-side and an outlet-side part circumferential face. The outlet-side part circumferential face has a first edge which faces the orifice and a second edge which faces away from the orifice. The first edge is assigned at least one geometrical feature which is configured to make the first edge non-uniform.

12 Claims, 3 Drawing Sheets

(51) Int. Cl.
  *F16K 3/32* (2006.01)
  *F16K 3/34* (2006.01)
(52) U.S. Cl.
  CPC ............... *F16K 3/312* (2013.01); *F16K 3/32* (2013.01); *F16K 3/34* (2013.01)
(58) Field of Classification Search
  CPC ..... F16K 3/24; F16K 3/32; F16K 3/34; F16K 25/02; F16K 27/00; F16K 27/04; F16K 27/041; F16K 27/044; F16K 47/08; F16K 47/10; F16K 3/0227; F16K 3/0236; F16K 27/045; F16K 27/105
  See application file for complete search history.

(56) References Cited

U.S. PATENT DOCUMENTS

| | | | | |
|---|---|---|---|---|
| 2,824,715 | A | * | 2/1958 | Williams ............... D21G 9/00 251/329 |
| 3,170,670 | A | | 2/1965 | Johnstone |
| 3,636,971 | A | | 1/1972 | Hagar |
| 3,945,606 | A | | 3/1976 | McDonald |
| 4,201,365 | A | * | 5/1980 | Paptzun ............... F16K 3/0263 251/326 |
| 4,354,663 | A | * | 10/1982 | Vanderburg ............ F16K 25/04 251/210 |
| 4,534,540 | A | | 8/1985 | Bragin et al. |
| 4,546,788 | A | | 10/1985 | Stalder et al. |
| 4,646,777 | A | | 3/1987 | Stalder et al. |
| 4,742,990 | A | * | 5/1988 | Stalder ............... F16K 3/316 251/326 |
| 5,295,661 | A | | 3/1994 | Roussel |
| 5,890,700 | A | | 4/1999 | Clarkson et al. |
| 2006/0191963 | A1 | * | 8/2006 | Klee ............... F16K 3/02 222/600 |
| 2013/0119288 | A1 | * | 5/2013 | Shaw ............... E21B 29/08 251/328 |

FOREIGN PATENT DOCUMENTS

| | | |
|---|---|---|
| CN | 201028026 Y | 2/2008 |
| CN | 201934057 U | 8/2011 |
| DE | 2103658 A1 | 12/1971 |
| DE | 3390493 C2 | 8/1988 |
| EP | 0185204 A2 | 6/1986 |
| EP | 0895011 A2 | 2/1999 |

OTHER PUBLICATIONS

International Search Report for PCT/EP2016/081243; dated Sep. 3, 2017; 7 pp.

* cited by examiner

VALVE DEVICE

CROSS-REFERENCE TO RELATED APPLICATIONS

This application is a continuation of co-pending international patent application PCT/EP2016/081243 filed on Dec. 15, 2016 and designating the U.S., which claims priority of German patent application DE 10 2015 121983.2 filed on Dec. 16, 2015. The entire contents of these priority applications are incorporated herein by reference.

BACKGROUND OF THE INVENTION

The present invention relates to a valve apparatus for a gaseous medium, having a valve body with an opening which can be flowed through in the flow direction by the medium and is delimited by way of a circumferential face in the valve body, and an orifice which is arranged in a gap within the valve body such that it can be displaced perpendicularly with respect to the flow direction, in order to influence the flow through the opening, the gap dividing the circumferential face into an inlet-side and an outlet-side part circumferential face, and the outlet-side part circumferential face having a first edge which faces the orifice and a second edge which faces away from the orifice.

Valve apparatuses of the abovementioned type are well known. They are used to regulate the throughflow of a, for example, gaseous medium through the opening. Said regulation takes place by virtue of the fact that the cross section of the opening, through which flow passes, is changed by way of displacement of the orifice perpendicularly with respect to the flow direction.

During operation, very pronounced noise emission occurred in valve devices of this type; said noise emission could be perceived, in particular, in a lift range of the orifice of approximately 40-100%.

Partially very pronounced noise emission of this type is not desired in many applications.

SUMMARY OF THE INVENTION

Against this background, it is the object of the present invention, in particular, to develop the valve device mentioned at the outset, in such a way that a reduction of the noise emission is achieved.

Said object is achieved, in particular, by virtue of the fact that the first edge is assigned at least one geometrical feature which is configured to make the first edge non-uniform.

The inventors have surprisingly determined that a non-uniform state of the geometry of the first edge leads to a reduction of the noise during flowing of a gaseous medium through the opening. The "breaking" of the symmetry of the flow clearly leads to a constant pressure wave which is responsible for the noise also changing.

In this context, the term "edge" is to be understood to mean an edge region which connects two faces to one another which lie substantially perpendicularly with respect to one another. As a consequence, "edge" is not to be understood to mean solely a geometrical line, but can also be an area.

It is particularly preferred that the at least one geometrical feature is configured as a recess in the outlet-side part circumferential face, which recess is open toward the first edge. There are preferably a plurality of recesses of this type.

Said one geometrical feature or plurality of geometrical features leads/lead to the first edge being given a non-uniform course which prevents a symmetrical configuration of the flow.

As an alternative or in addition, the geometrical feature can also be configured as at least one elevation which is provided on the first edge and preferably protrudes into the opening.

As a result, the geometry of the edge which is flowed onto by the flow also changes, with the result that a symmetrical flow is likewise prevented as a result.

A geometrical feature of this type is particularly preferably of flexible configuration, that is to say is made from a flexible material, such as rubber.

The use of a flexible material has proven advantageous with regard to the reduction of the noise.

In addition or as an alternative, the geometrical feature is configured as an element which is arranged in the gap, is preferably flexible, and protrudes into the opening. The geometrical feature is particularly preferably part of an end seal for the orifice.

Said geometrical feature has also proven particularly advantageous and, in addition, can be realized very inexpensively, since there has to be an end seal of this type for the orifice in any case.

In a further preferred embodiment, the valve body is configured as a cast part, and the geometrical feature is a constituent part of the cast part.

Said measure has the advantage that the geometrical feature which is required to reduce the noise can also already be configured very simply during the casting production of the valve body. Subsequent machining steps are not required as a result.

It goes without saying that it would also be conceivable to produce the valve body using the casting method and to introduce the geometrical features in a subsequent material-removing step. The advantage of said solution would consist in that only one casting mold would be necessary for the two housing plates.

In one preferred development, the orifice has a lower edge which is of arcuate, preferably partially circular or partially elliptical configuration.

The geometrical feature is further preferably provided in a region of the circumferential face, which region is adjacent with respect to that region of the gap, into which the orifice dips during the closure of the opening.

That is to say, in other words, the geometrical feature is provided in a region of the opening, which region lies in the flow virtually in the entire operating region of the valve apparatus. The geometrical feature particularly preferably lies in a region of the circumferential face, which region lies in the flow when the orifice is open by 60% (100% means completely open), preferably by 40%, very preferably by 20%.

The invention is of particular interest in the case of an orifice regulating slide valve for regulating the gas throughflow.

It goes without saying that the features which are mentioned in the above text and are still to be described in the following text can be used not only in the respectively specified combination, but rather also in other combinations or on their own, without departing from the scope of the present invention.

BRIEF DESCRIPTION OF THE DRAWINGS

Further advantages and embodiments of the invention result from the description and the appended drawing, in which.

DETAILED DESCRIPTION OF PREFERRED EMBODIMENTS

Figure 3A:
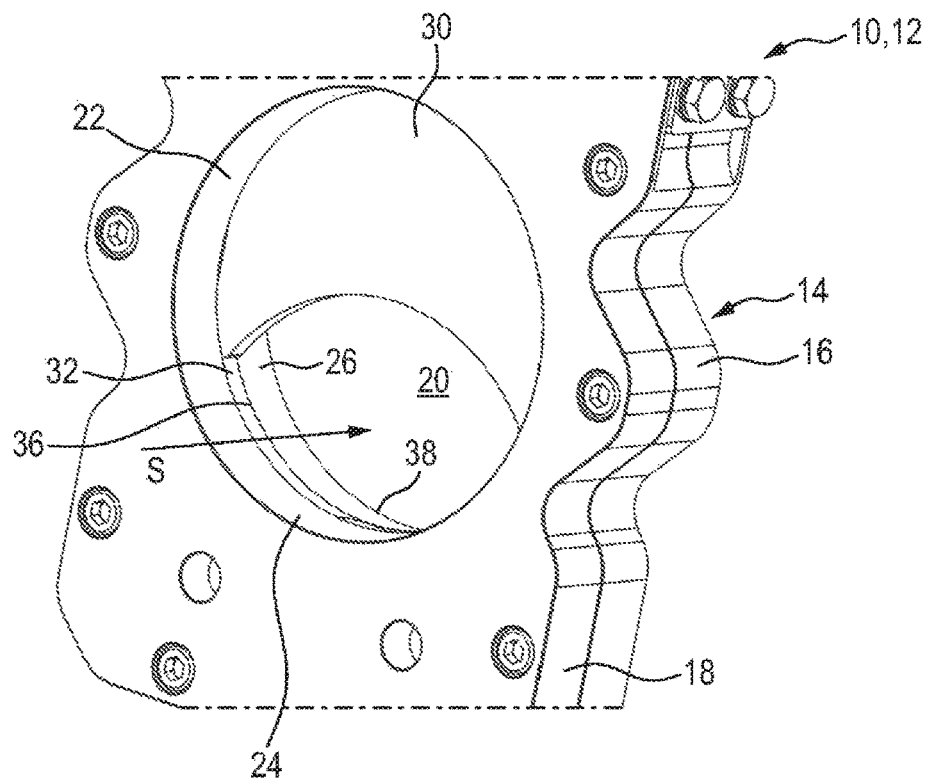
FIG. 3A shows a diagrammatic perspective illustration of a valve apparatus according to the prior art.

FIG. 3A shows a greatly simplified, diagrammatic perspective illustration of a valve which is denoted by the designation numeral 10. For reasons of simplification, only very few structural elements of the valve are shown. The valve 10 can be configured, for example, as an orifice regulating slide valve 12 (also referred to herein as a "slide gate").

The valve 10 comprises a valve body 14 which consists of at least two housing plates 16, 18 which are connected releasably to one another.

An opening 20, preferably a circular opening, is provided in the valve body 14 and therefore in the two housing plates 16, 18, through which opening 20 a gaseous medium is to flow. The flow direction which is provided is shown by way of an arrow S in FIG. 3A.

The opening 20 in the valve body 14 is delimited in the radial direction, that is to say at a right angle with respect to the flow direction S, by way of a circumferential face 22. The circumferential face 22 preferably extends parallel to the flow direction S.

As viewed in the flow direction S, the circumferential face 22 is divided into two part circumferential faces 24, 26 which are configured on the two housing plates 16, 18. Owing to the flow direction S, the part circumferential face is called an inlet-side part circumferential face 24, and the part circumferential face 26 is called an outlet-side part circumferential face 26.

In order to regulate the throughflow of the medium, preferably gas, through the opening 20, an orifice 30 is provided. The orifice 30 is of plate-shaped configuration and is held between the two housing plates 16, 18 such that it can be moved perpendicularly with respect to the flow direction S. For this purpose, a gap 32 is provided between the two housing plates 16, 18, in which gap 32 the orifice 30 is held. The opening 20 can be opened completely and closed completely by way of the movement of the orifice 30. In the example which is shown in FIG. 3A, the orifice 30 is approximately 60% closed.

The two part circumferential faces 24, 26 are separated from one another by way of the gap 32, with the result that, as viewed in the flow direction S, an edge 36 is formed on the outlet-side part circumferential face 26. Said edge 36 is the connecting region between the part circumferential face 26 which extends in parallel in the flow direction S and a face of the housing plates 16, which face runs perpendicularly with respect thereto.

Although the edge 36 is linear in the illustration which is shown in FIG. 3A, flat regions are also to be understood as an edge within the context of the present description, which flat regions produce the connection between the two faces, that is to say the part circumferential face and that face of the housing plate which runs perpendicularly with respect thereto.

The part circumferential face 26 has a further edge 38 which follows the first edge 36 as viewed in the flow direction S.

Figure 3B:
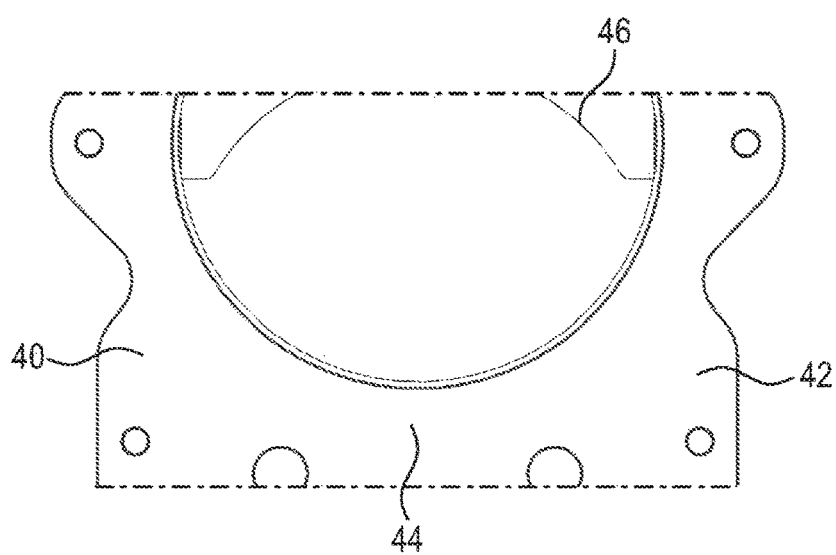
FIG. 3B shows a diagrammatic illustration of the valve apparatus from FIG. 3A, in a front view.

As also results from FIG. 3B, the gap 32 and therefore the receiving space for the orifice 30 are delimited laterally by guides 40, 42, in which the orifice is firstly guided for movement purposes and is secondly sealed by way of corresponding seals. In the lower region of the valve body 14, a seal or end seal 44 is provided in the gap 32, the shape of which seal or end seal 44 is adapted to the shape of the facing edge of the orifice 30. In the closed state, the lower edge which is denoted by the designation 46 bears with a sealing action.

In the present exemplary embodiment, the edge 46 of the orifice has an arcuate shape, preferably a partially circular or partially elliptical shape.

During the operation of the valve 10, a medium, preferably gas, flows through the opening 20 which is, for example, partially closed, the flow also running beyond the first edge 36.

The inventors have now determined surprisingly that the first edge 36 is the cause for very pronounced noise emission. A constant pressure wave which causes the noise emissions is produced at the symmetrical edge 36.

In order to reduce the noise emission, one or more geometrical features which breaks/break the symmetry of the edge 36 is/are provided at the first edge 36 on the outlet-side part circumferential face 26, in particular in the lower region. That is to say, in other words, the course of the edge 36 is made non-uniform at least in a defined circumferential region of the circumferential face 26. Here, "lower region" denotes that region of the part circumferential face 26 which lies opposite the lower edge 46 of the orifice 30. The "lower region" is, in particular, that region of the part circumferential face 26 which, in the case of opening of the orifice, lies exposed or is flowed onto, that is to say is not covered by the orifice, by up to 60%, preferably by up to at most 40%.

A very wide variety of elements which influence the flow in this region can be provided as geometrical features. For instance, for example, elevations can be provided on the part circumferential face 26 as geometrical features, which elevations protrude into the opening 20. The course of the edge 36 which is flowed onto by the flow changes as a result of said elevations.

Figure 1A:
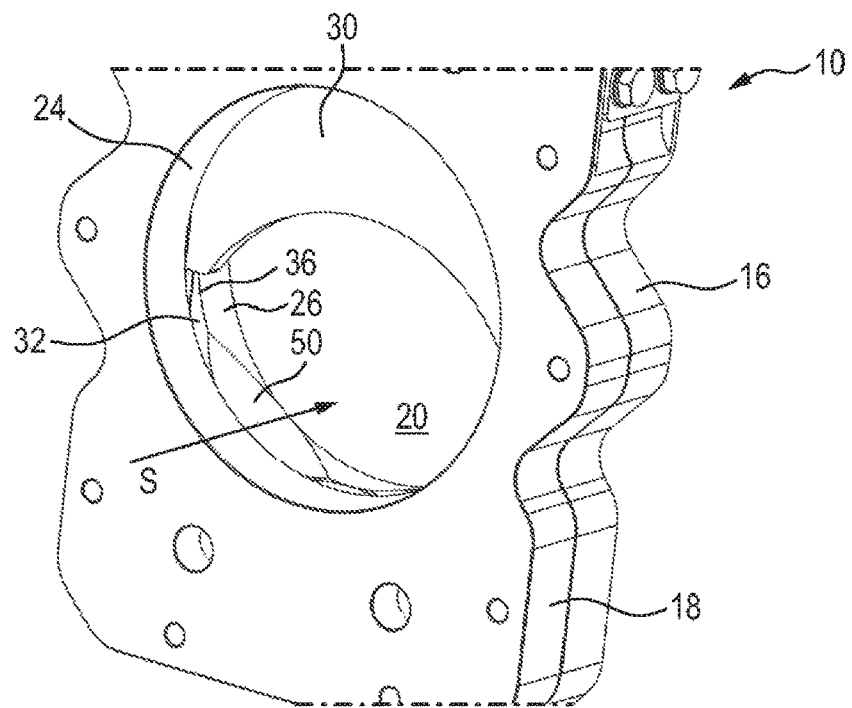
FIG. 1A shows a diagrammatic illustration of a valve apparatus according to the invention.

A depression which is provided in the part circumferential face 26 and is configured with an open edge in the region of the first edge 36 has proven to be a particularly advantageous geometrical feature. FIG. 1A shows a embodiment of this type.

For reasons of simplification, the same designations are used for identical components in FIGS. 1A, B and 2A, B as in FIGS. 3A, B, with the result that a repeated explanation of said components can be dispensed with.

In FIG. 1A, the recess in the part circumferential face 26 is labeled with the designation 50. The recess 50 is configured with an open edge with respect to the edge 36, with the result that the course of the edge 36 changes in the region of the recess 50. The recess 50 can have different shapes, as long as the course of the edge 36 changes. In the present exemplary embodiment, the recess 50 has a circular segment shape as viewed in plan view.

Two recesses 50 of this type are particularly preferably provided in the part circumferential face 26. Here, the one recess 50 or the plurality of recesses 50 is/are provided in a lower region of the part circumferential face 26. In this context, "lower" means that region, toward which the orifice 30 moves during the closure of the opening.

Figure 1B:
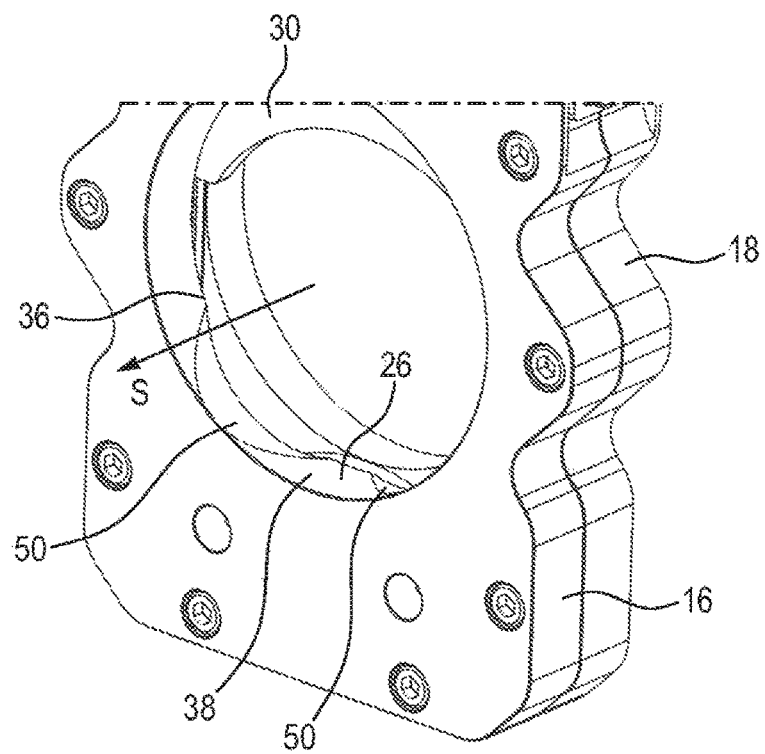
FIG. 1B shows a diagrammatic illustration of the valve apparatus from FIG. 1A from the other side.

FIG. 1B shows the valve 10 from FIG. 1A, but from the other side. That is to say, the outlet-side housing plate 16 and therefore also the outlet-side part circumferential face 26 can now be seen in the foreground. Two recesses 50 can be seen which, as has already been described, change the course of the first edge 36. It can also be seen, however, that the recesses 50 do not change, that is to say leave unchanged, the course of the further edge 38 of the part circumferential face 26. It is to be noted at this point, however, that a change of the edge 38 would likewise be possible.

Figure 2A:
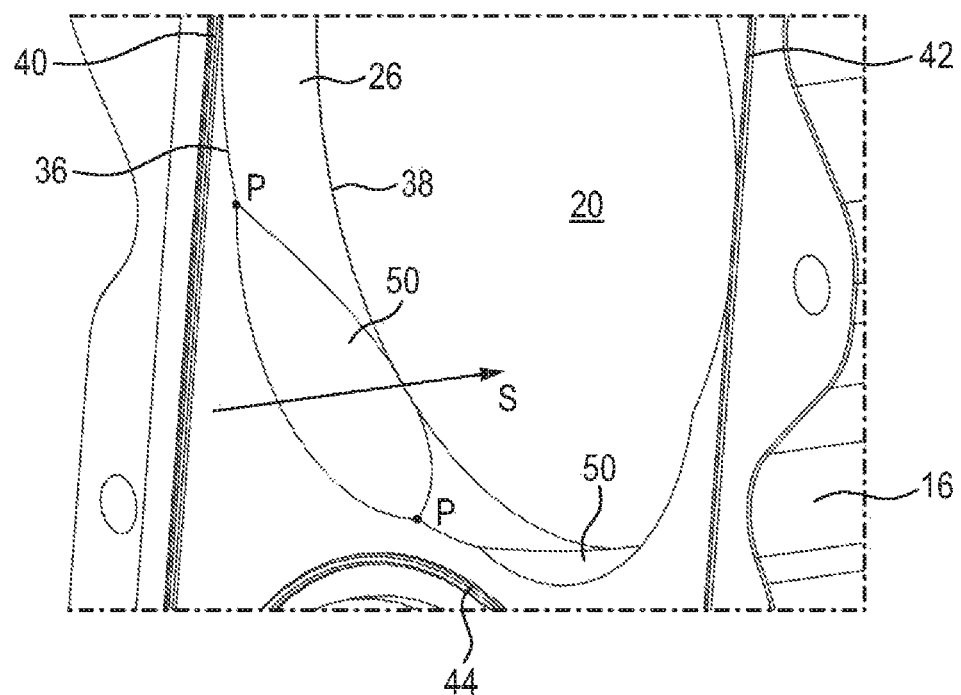
FIG. 2A shows a diagrammatic illustration of a detail of the valve body.
Figure 2B:
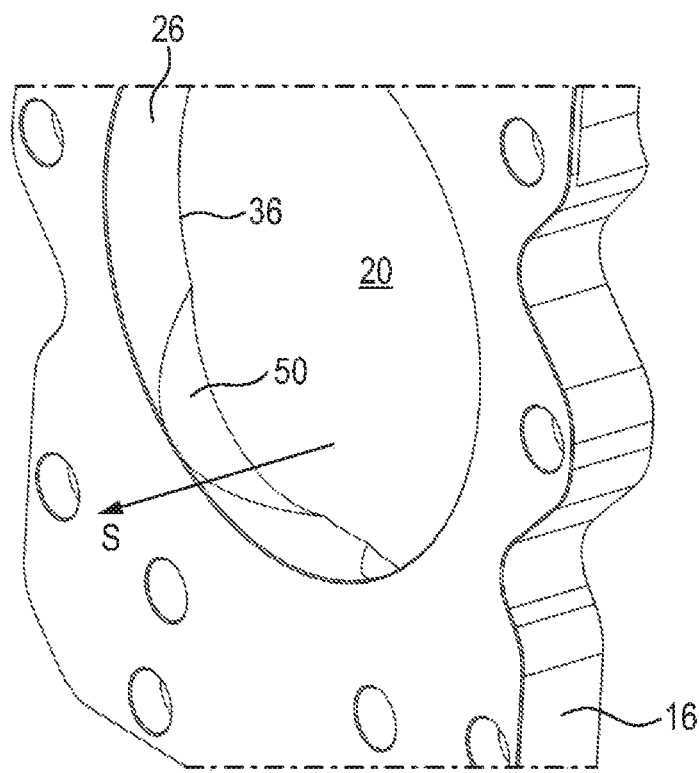
FIG. 2B shows a diagrammatic illustration of the valve body which is shown in FIG. 2A, from another perspective.

For further clarification of the configuration of the part circumferential face 26, FIGS. 2A and 2B show the housing plate 16 on its own without the further housing plate 18, from both sides. Here, the guide 40, 42 for the orifice 30 and the lower seal or end seal 44 can be seen in FIG. 2A. Furthermore, the illustration in FIG. 2A once again clarifies that the course of the edge 36 changes as a result of the recess 50 at the points which are identified by P, and therefore breaks the symmetry of the edge 36.

This change of the edge course of the edge 36 which is flowed onto leads to a considerable reduction of the noise emission, without causing excessive pressure losses, however. Since the production of the recesses 50 can already take place during casting of the housing plate 16, the geometrical features 50 can be realized very simply and inexpensively.

It goes without saying that the shape of the recess 50 can be varied, as long as the edge course of the edge 36 changes as a result.

In addition or as an alternative, the seal 44 can be configured in such a way that it protrudes into the opening 20. The edge 36 which is flowed onto by the flow also changes as a result of a measure of this type, with the result that a non-uniform state or asymmetry is achieved.

The overall result is that a simple solution for reducing the noise emission is provided by way of the configuration of at least one geometrical feature on the outlet-side part circumferential face, for example in the form of recesses 50.

The invention claimed is:

1. A valve apparatus for a gaseous medium, the valve apparatus comprising:
   a valve body including a circular opening, wherein:
      the gaseous medium is flowable through the circular opening in a flow direction and
      the circular opening is delimited by a circumferential face in the valve body;
   an end seal; and
   a slide gate that is arranged in a gap of the valve body and is configured to, during a closure of the circular opening, dip into a region of the gap, wherein:
      the slide gate is displaceable perpendicularly with respect to the flow direction to influence a flow of the gaseous medium through the circular opening,
      the gap divides the circumferential face into an inlet-side part and an outlet-side part of the circumferential face,
      the outlet-side part of the circumferential face follows the inlet-side part of the circumferential face in the flow direction,
      the outlet-side part of the circumferential face includes a first edge that faces the slide gate and a second edge that faces away from the slide gate,
      the valve body includes a plurality of geometrical features arranged in a region of the outlet-side part of the circumferential face that is adjacent to the region of the gap,
      the plurality of geometrical features is configured with respect to the first edge to make the first edge non-uniform,
      the plurality of geometrical features includes a plurality of recesses in the outlet-side part of the circumferential face that open towards the first edge of the outlet-side part of the circumferential face,
      the slide gate includes a lower edge that seats against the end seal, and
      the lower edge of the slide gate is of concave arcuate configuration.

2. The valve apparatus of claim 1, wherein the valve body includes two elements that are connected to one another.

3. The valve apparatus of claim 2, wherein the two elements of the valve body are plate-shaped.

4. The valve apparatus of claim 1, wherein at least one of the plurality of geometrical features includes a flexible material.

5. The valve apparatus of claim 1, wherein:
   the valve body is configured as a cast part and
   the cast part includes the plurality of the geometrical features as constituent parts.

6. The valve apparatus of claim 1, wherein the slide gate is configured to, when the slide gate is in a fully opened position, release an entire cross section of the circular opening of the valve body.

7. The valve apparatus of claim 1, wherein:
   the valve apparatus is configured as a slide gate regulating slide apparatus and
   the slide gate regulating slide apparatus is configured to regulate the gaseous medium in the flow direction.

8. The valve apparatus of claim 1, wherein:
   the plurality of geometrical features are arranged in the region of the outlet-side part of the circumferential face, such that, when the slide gate is 60% open, the region of the outlet-side part of the circumferential face is hit by the gaseous medium when the gaseous medium flows through the circular opening in the flow direction and
   the slide gate is 0% open when the circular opening of the valve body is completely closed by way of the slide gate.

9. The valve apparatus of claim 1, wherein:
   the plurality of geometrical features are arranged in the region of the outlet-side part of the circumferential face, such that, when the slide gate is 40% open, the region of the outlet-side part of the circumferential face is hit by the gaseous medium when the gaseous medium flows through the circular opening in the flow direction and
   the circular opening of the valve body is completely closed by way of the slide gate being 0% open.

10. The valve apparatus of claim 1, wherein the lower edge of the slide gate is of partially circular or partially elliptical configuration.

11. The valve apparatus of claim 1, wherein the circumferential face is parallel to the flow direction.

12. A valve apparatus for a gaseous medium, the valve apparatus comprising:
   a valve body including a circular opening, wherein:
      the gaseous medium is flowable through the circular opening in a flow direction and the circular opening is delimited by way of a circumferential face in the valve body, an end seal; and a slide gate that is arranged in a gap of the valve body, wherein:

the slide gate is configured to be displaceable perpendicularly with respect to the flow direction to influence a flow of the gaseous medium through the circular opening, the gap divides the circumferential face into an inlet-side part and an outlet-side part of the circumferential face, the outlet-side part of the circumferential face includes a first edge that faces the slide gate and a second edge that faces away from the slide gate, the valve body includes a plurality of recesses in the outlet-side part of the circumferential face, the plurality of recesses are open toward the first edge, the slide gate includes a lower edge that seats against the end seal, and the lower edge of the slide gate is of concave arcuate configuration.

\* \* \* \* \*

UNITED STATES PATENT AND TRADEMARK OFFICE
CERTIFICATE OF CORRECTION

PATENT NO. : 10,900,572 B2
APPLICATION NO. : 16/006045
DATED : January 26, 2021
INVENTOR(S) : Robert Binder It is certified that error appears in the above-identified patent and that said Letters Patent is hereby corrected as shown below:

On the Title Page

Column 1, Related U.S. Application Data (63), Line 2    "filed on Dec. 15, 2015" should be
--filed on Dec. 15, 2016--

In the Claims

Claim 12, Column 7, Line 2    "body," should be --body;--

Signed and Sealed this
Twentieth Day of July, 2021

Drew Hirshfeld
*Performing the Functions and Duties of the
Under Secretary of Commerce for Intellectual Property and
Director of the United States Patent and Trademark Office*